(12) United States Patent
Kuo

(10) Patent No.: US 6,667,818 B1
(45) Date of Patent: Dec. 23, 2003

(54) MULTIPLE-FIELD SENSOR FOR SCANNING SYSTEM

(75) Inventor: Shih-Zheng Kuo, Taipei Hsien (TW)

(73) Assignee: Umax Data Systems, Inc., Hsinchu (TW)

( * ) Notice: Subject to any disclaimer, the term of this patent is extended or adjusted under 35 U.S.C. 154(b) by 627 days.

(21) Appl. No.: 09/695,440

(22) Filed: Oct. 23, 2000

(51) Int. Cl.[7] .............................. H04N 1/04; H04N 1/46; H04N 1/00; H04N 5/335; H01L 27/00
(52) U.S. Cl. ................. 358/514; 358/512; 358/408; 358/514; 358/517; 358/482; 250/208.1; 348/297; 348/298
(58) Field of Search .................. 358/512, 408, 358/514, 517, 482; 250/208.1; 348/297, 298

(56) References Cited

U.S. PATENT DOCUMENTS

| | | | | |
|---|---|---|---|---|
| 5,784,101 A | * | 7/1998 | Hasegawa | 348/282 |
| 5,949,483 A | * | 9/1999 | Fossum et al. | 348/303 |
| 6,069,973 A | * | 5/2000 | Lin et al. | 382/167 |
| 6,496,286 B1 | * | 12/2002 | Yamazaki | 358/514 |
| 6,597,401 B1 | * | 7/2003 | Maruyama | 348/335 |

* cited by examiner

*Primary Examiner*—Edward Coles
*Assistant Examiner*—Houshang Safaipour
(74) *Attorney, Agent, or Firm*—J.C. Patents

(57) ABSTRACT

A multiple-field sensor for a scanner suitable for scanning a document. The scanner includes a multiple-field sensor, an average accumulator, and a block of memory. The multiple-field sensor has a plurality of sensing lines for each color channel. Each sensing line picks up a portion of image signal from the document during scanning. The sensing lines scan the same portion of the document to produce corresponding image signals. The average accumulator averages the image signals obtained from the sensing lines of the same color channel to produce an average image signal. The block of memory is used as a storage area for image signals in general and the average image signal in particular.

7 Claims, 3 Drawing Sheets

MULTIPLE-FIELD SENSOR FOR SCANNING SYSTEM

BACKGROUND OF THE INVENTION

1. Field of Invention

The present invention relates to a scanner and a scanning method. More particularly, the present invention relates to a multiple-field sensor for image scanning.

2. Description of Related Art

Due to the rapid development of multimedia technologies, image processing speed and clarity have become an important consideration in the selection of a scanner by users. However, a scanner operates according to light reflected from a document. Hence, outside light or any irregular dispersion, diffraction may lead to certain degree of distortion for a scanned image. In addition, limitations in the manufacturing of sensors also contribute to the production noise signals that further distort the image.

An attempt to deal with image distortion problem has been proposed in the Taiwan Patent No. 385608. In the invention, a sensor is used to scan a document a multiple of times to obtain a multiple of scanned images. Thereafter, the scanned images are averaged to reduce the amount of distortion to the actual image. However, this and similar type of designs require multiple scanning and the sensor has to shuttle forward and backward many times. Hence, the scanning is time-consuming and highly inefficient.

In brief, common defects of conventional scanning techniques include:

1. The scanned image is likely to be distorted if noise signals contained within the image are untreated; and
2. If the scanned image is treated by scanning the same documents a few times using the same sensor, the sensor has to shuttle many times leading to time wastage and hardware control problems.

SUMMARY OF THE INVENTION

Accordingly, one object of the present invention is to a multiple-field sensor for a scanner suitable for scanning a document. The scanner includes a multiple-field sensor, an average accumulator, and a block of memory. The multiple-field sensor has a plurality of sensing lines for each color channel. Each sensing line picks up a portion of image signal from the document during scanning. The sensing lines scan the same portion of the document to produce corresponding image signals. The average accumulator averages the image signals obtained from the sensing lines of the same color channel to produce an average image signal. The block of memory is used as a storage area for image signals in general and the average image signal in particular. In addition, the scanner further includes a memory read/write address controller. The memory read/write address controller supplies addresses for storing and retrieving the image data and the average image data to and from the memory blocks.

The invention also provides a scanning method that utilizes a multiple-field sensor. The multiple-field sensor has a plurality of sensing lines corresponding to each color channel. Each sensing line can be used for scanning a document to obtain a corresponding portion of the image signal. First, the scanning lines sequentially scan an identical portion of the document to obtain a plurality of image signals. Thereafter, the image signals are averaged to obtain an average image signal. Finally, the average image signal is output. In addition, the step of obtaining an average image signal includes first storing the image signals and then adding up the image signals. Lastly, the sum is averaged to obtain the average image signal. Furthermore, the steps for obtaining an average image signal by the scanning method of this invention are executed in a pipeline mode.

In brief, a multiple-field sensor is used to obtain a multiple of image signals at the same time. The image signals are then accumulated and averaged in a pipeline mode of operation. Hence, image distortion due to noise interference is reduced without increasing scanning time.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
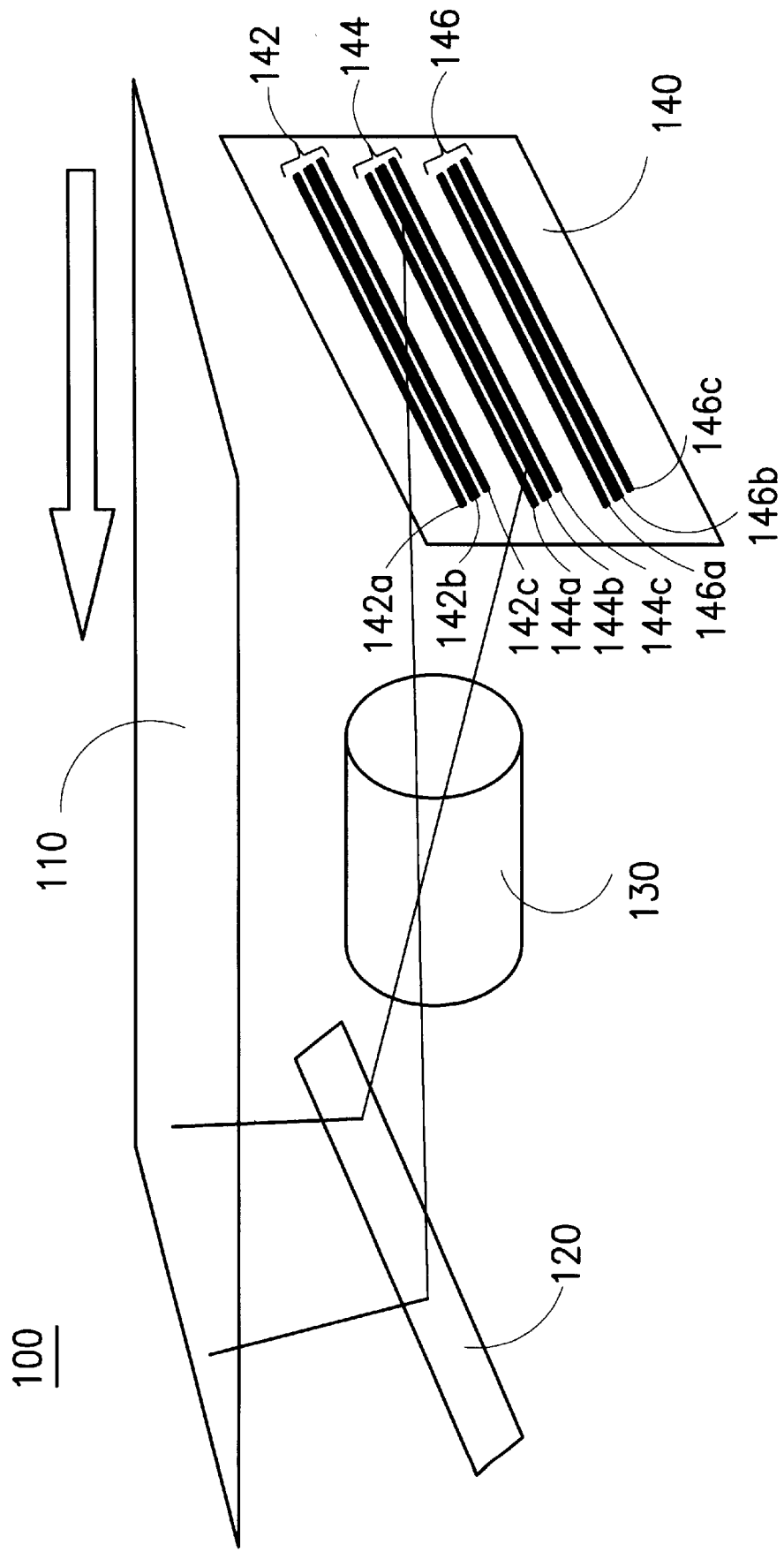
FIG. 1 is a schematic diagram showing a scanning system according to a first preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic diagram showing a scanning system according to a first preferred embodiment of this invention. The scanner 100 includes a group of reflecting mirrors 120, a group of lenses 130 and a multiple-field sensor 140. Light reflected from a scan document 110 or light passing through a transparent document 110 is reflected by the reflecting mirror 120 and transmitted to the multiple-field sensor 140 after passing through the group of lenses 130. The multiple-field sensor 140 has a plurality of sensing elements 142, 144 and 146. In this embodiment, each of the sensing elements 142, 144 or 146 has three sensing lines. They are sensing lines 142a, 142b and 142c for the sensing element 142, sensing lines 144a, 144b and 144c for the sensing element 144, and sensing lines 146a, 146b and 146c for the sensing element 146. Although three sensing lines are shown in each sensing element, the actual number of sensing lines for each sensing element is a variable. Any scanner that employs a multiple-field sensor, or in other words, a scanner with multiple sensing line in a single color channel, can use the invention to obtain the same effects. For example, each of the sensing elements 142, 144 and 146 may contain sensing lines to deal with the color channels RGB (such as 142a for the R channel, 142b for the G channel, 142c for the B Alternatively, a multiple of sensing lines in each sensing element may deal with the same color channel (such as 142a~142c for the R channel, 144a~144c for the G channel, and 146a~146c for the B channel). Obviously, a mono-color scanner can still use the system provided by the invention.

In this embodiment, light emitted from an identical portion of the scan document 110 will be reflected by the reflecting mirror 120 and transmitted through the lenses 130. Thereafter, according to the sequence arrangement of the sensing elements 142, 144, 146 and the forward-moving direction of the multiple-field sensor 140, the light will shine onto the sensing elements 142, 144 and 146. In other words, the sensing elements 142, 144 and 146 pick up light from the same portion of the scan document 110 and then the scanned image signals are accumulated and averaged. The accumulated average signals thus obtained serves as data for subsequent image processing.

Figure 2:
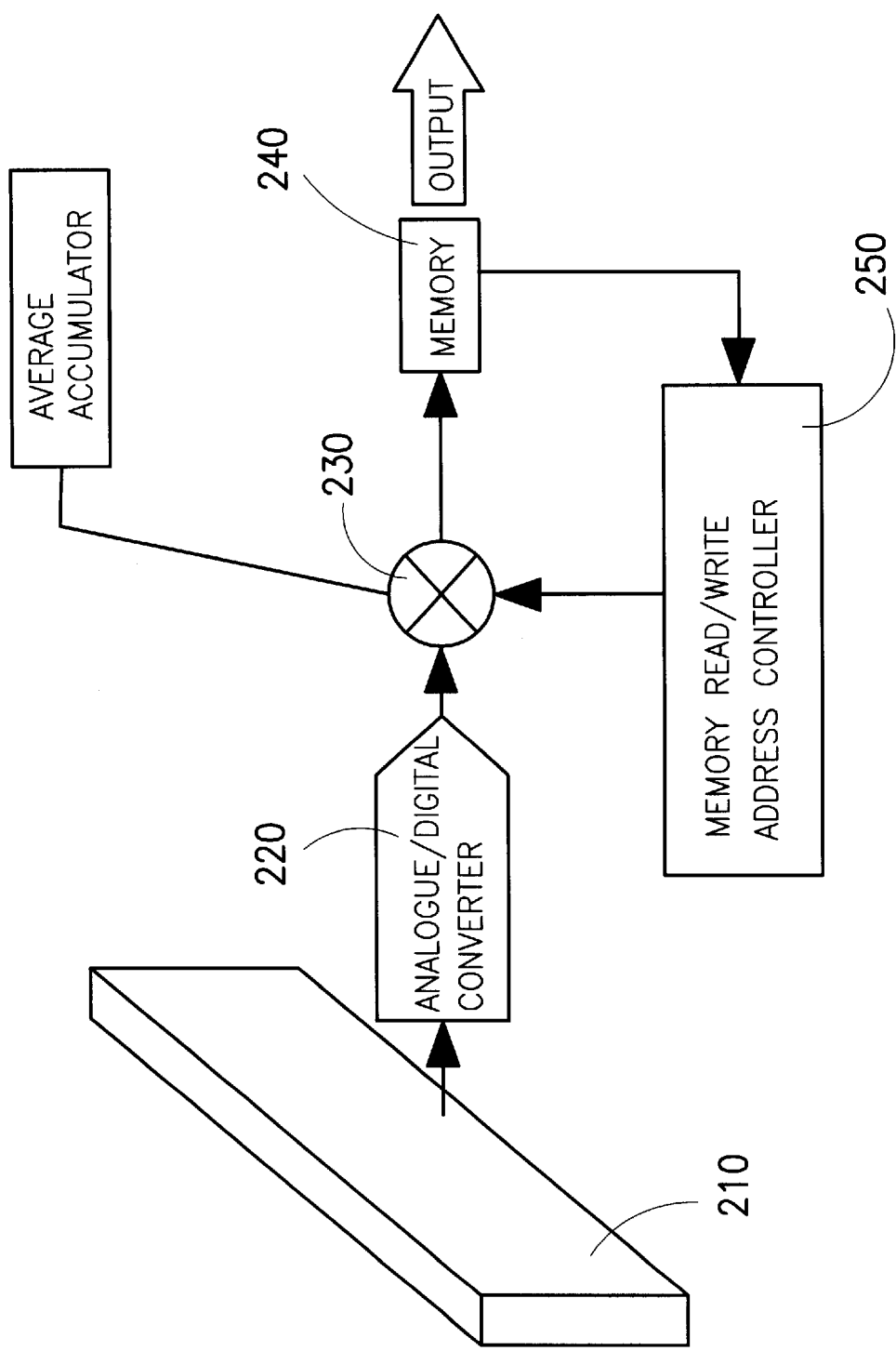
FIG. 2 is a block diagram showing the internal circuitry of a scanner according to a second preferred embodiment of this invention.

FIG. 2 is a block diagram showing the internal circuitry of a scanner according to a second preferred embodiment of this invention. In the second embodiment, the scanner includes a multiple-field sensor 210, an analogue/digital converter 230, an average accumulator 230, a block of memory 240 and a memory read/write address controller 250. The average accumulator includes an adder and a divider that adds and averages incoming image data. The analogue signals received by the multiple-field sensor 210 represent image signals. The analogue signals are sent to the analogue/digital converter 220 and converted into digital image signals. The digital image signals are sent to the average accumulator 230 for further processing before transmitting to the memory 240 for storage. The average accumulator 230 operates on image data and data inside the memory 240. When a portion of a scan document is scanned the first time, image signal obtained from the scanning is directly sent to the memory 240 for storage. When the same portion of the document is scanned by other sensing elements, the scanned image and the data stored inside the memory 240 are added together inside the average accumulator 230. The resulting image data is again sent to the memory 240 for storage serving as the next image signal for the average accumulator 230. When the last image signal that corresponds to the same portion of the scan document is transmitted from the multiple-field sensor 210 via the analogue/digital converter 220 into the average accumulator 230, image data stored inside the memory 240 corresponding to the same portion of the document is also sent to the average accumulator 230. The image signals are added together and then the combined image signal is sent to the divider to perform an averaging operation. Hence, an average image signal is obtained. The average image signal is sent to the memory 240 serving as data for subsequent image processing.

In the second embodiment, the memory read/write address controller 250 mainly serves as a memory administrator. The controller 250 provides the address of stored data to the average accumulator 230 and address for storing the results in the memory 240 after image data is added or averaged by the average accumulator 230.

Obviously, in signal processing, image signal generated by the sensing line for color channel R can only accumulate with image signal generated by other sensing line of the same color channel R to form an average image signal. Image signal of other color channel such as color channel G and color channel B will be unaffected. Similarly, the treatment of other color channels (G and B) will not mixed with the color channel R.

Figure 3:
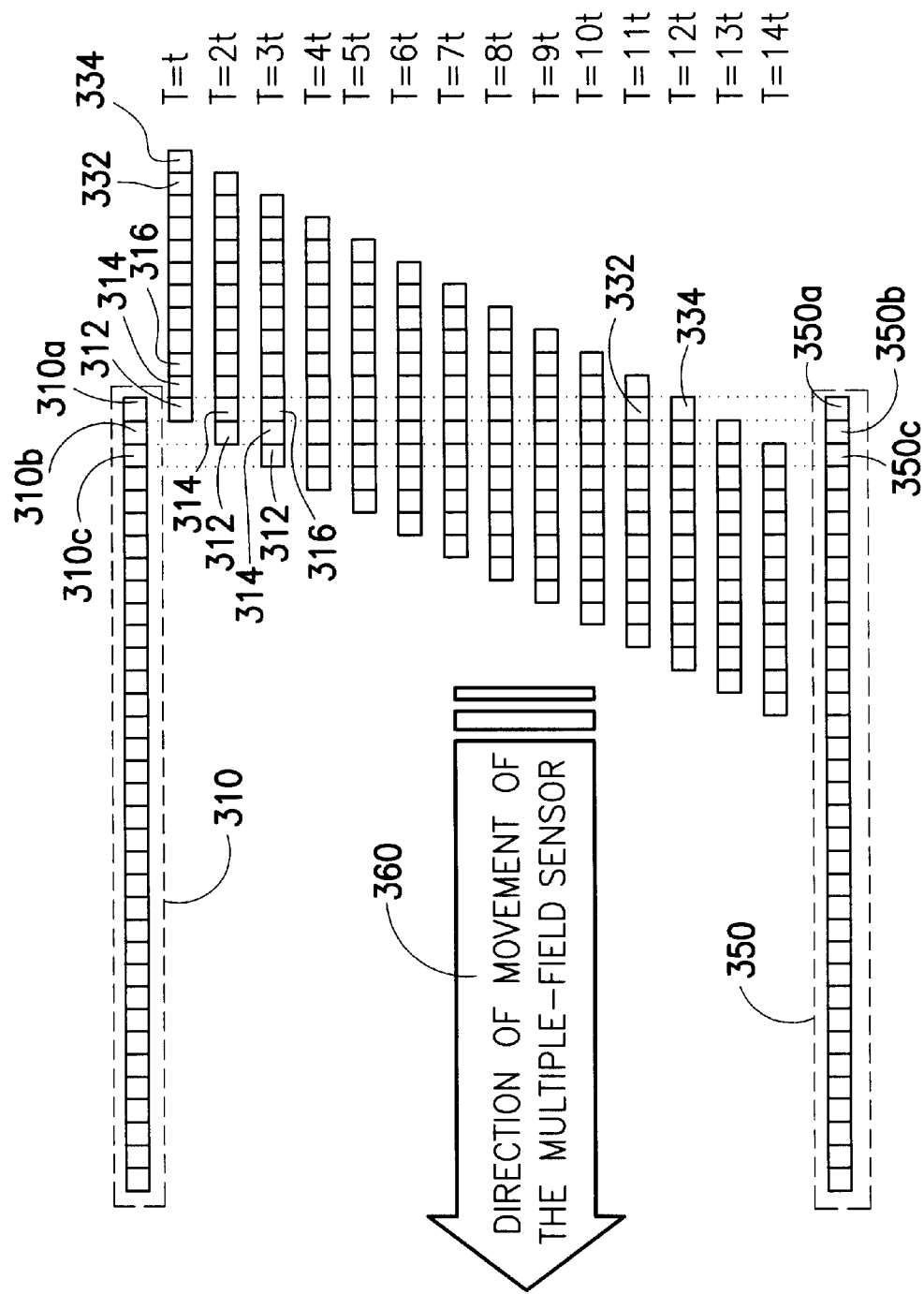
FIG. 3 is a schematic diagram showing the data generation sequence inside a scanner according to a third preferred embodiment of this invention.

FIG. 3 is a schematic diagram showing the data generation sequence inside a scanner according to a third preferred embodiment of this invention. As shown in FIG. 3, at T=t, the sensing element 312 obtains a portion of an image signal 310a from a scan document 310. Thereafter, the multiple-field sensor moves in the arrow direction 360. At T=2t and T=3t, the sensing element 314 and sensing element 316 each scans over a portion 310a of the scan document 310 and hence each obtains a corresponding image signal. At the same time, the sensing element 312 scans over the portions 310b and 310c of the scan document 310 and obtains corresponding image signals.

At T=t, image signal obtained by sense element 312 through scanning the portion 310a of the scan document is stored in the memory. At T=2t, the image signal obtained by sense element 312 through scanning the portion 310a of the scan document is added to a previous image signal similarly obtained by the sense element 312 through scanning the identical portion 310a. The result of the addition is stored in the memory. Such accumulation of image signal continues until time T=12t when the image signal obtained by sensing element 334 scanning over the portion 310a of the scan document is also added to the accumulated sum. After the addition of the last image signal, the accumulated sum of the images signals are averaged by the average accumulator 230 shown in FIG. 2. The averaged image signal (obtained at T=3t, for example) serves as data source for subsequent image processing.

Other portions of the scan document 310 such as 310b and 310c are similarly processed according to the aforementioned method, executing in a pipeline mode. Hence, after obtaining the first average image signal at T=13t, an average image signal is obtained at every interval of t. Although the averaging method can obtain a low noise level scan image, a processing time very close to a conventional scanner is required (the invention requires only an additional 13t to process).

In summary, the scanner in this invention is able to produce low noise level scan images in a very short time.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A scanner having multiple-field sensor for scanning a document, comprising:

a multiple-field sensor having a plurality of sensing lines for each color channel, wherein each sensing line is able to obtain a corresponding image signal during scanning;

an average accumulator for adding together and averaging image signals from all the sensing line that corresponds to the scanning an identical portion of the document, and outputting an average image signal; and a memory for storing the image signals obtained from the sensing lines and the average image signal.

2. The scanner of claim 1, wherein the scanner further includes a memory read/write address controller for controlling memory accessing addresses.

3. The scanner of claim 1, wherein the average accumulator further includes an adder and a divider, the adder is used for accumulating image signals and the divider is used for averaging the sum of image signals to produce an average image signal.

4. An image scanning method that utilizes a multiple-field sensor having a plurality of sensing lines for each color channel and with each sensing line capable of scanning a scan document, comprising the steps of:

sequentially scanning an identical portion of the scan document using the sensing lines to obtain a plurality of corresponding image signals;

averaging the image signals to produce an average image signal; and outputting the image signal.

5. The method of claim 4, wherein the step of averaging the image signals includes the substeps of:

storing each image signal;

summing the image signals cumulatively; and averaging the sum of the image signals to produce an average image signal.

6. The method of claim 4, wherein the averaging the image signals is executed in a pipeline mode.

7. An image scanning method that utilizes a multiple-field sensor having a plurality of sensing lines for each color channel and with each sensing line capable of scanning a scan document, comprising the steps of:

sequentially scanning an identical portion of the scan document using the sensing lines to obtain a plurality of corresponding image signals;

storing each image signal;

summing the image signals cumulatively; and averaging the sum of the image signals to produce an average image signal.

* * * * *